United States Patent

[15] 3,644,952
[45] Feb. 29, 1972

Hatch

[54] CANOPY FRAME ASSEMBLY FOR CAB OF AIRPLANE LOADING AND UNLOADING RAMP

[72] Inventor: Gerald S. Hatch, South Ogden, Utah
[73] Assignee: Stanray Corporation, Chicago, Ill.
[22] Filed: July 29, 1970
[21] Appl. No.: 59,130

[52] U.S. Cl. ................................................14/71, 135/5 A
[51] Int. Cl. ..........................................................B65g 11/00
[58] Field of Search ..........................135/5 A; 14/71; 52/204

[56] References Cited

UNITED STATES PATENTS

| | | | |
|---|---|---|---|
| 3,484,883 | 12/1969 | Van Marle | 14/71 |
| 3,161,231 | 12/1964 | Dawson | 160/132 |
| 3,528,086 | 9/1970 | Conger | 135/5 A |
| 3,541,626 | 11/1970 | Eggert | 14/71 |
| 3,479,677 | 11/1969 | Burns | 14/71 |

Primary Examiner—Jacob L. Nackenoff
Attorney—Harris, Kiech, Russell & Kern

[57] ABSTRACT

A passenger loading and unloading ramp, bridge, tunnel, gangway or conveyance for airplanes provided at its outer end with a cab having a flexible canopy structure providing a weathertight seal between the cab and the fuselage of the airplane around a doorway with which the passageway through the cab registers. The canopy structure includes a canopy frame assembly which includes a series of canopy frames spaced-apart longitudinally of and enclosing the passageway through the cab, each frame having the general configuration of an inverted U and including laterally spaced, generally upright arms located on opposite sides of the passageway and connected at their lower ends to the supporting structure of the cab. The canopy frames are rigid transversely of the passageway through the cab, but the arms of the frames are flexible longitudinally of the passageway. With this construction, the canopy frame assembly may flex as required to permit the canopy structure to achieve weathertight seals with a wide variety of airplane fuselage configurations.

9 Claims, 7 Drawing Figures

INVENTOR
GERALD S. HATCH
BY HIS ATTORNEYS
HARRIS, KIECH, RUSSELL & KERN

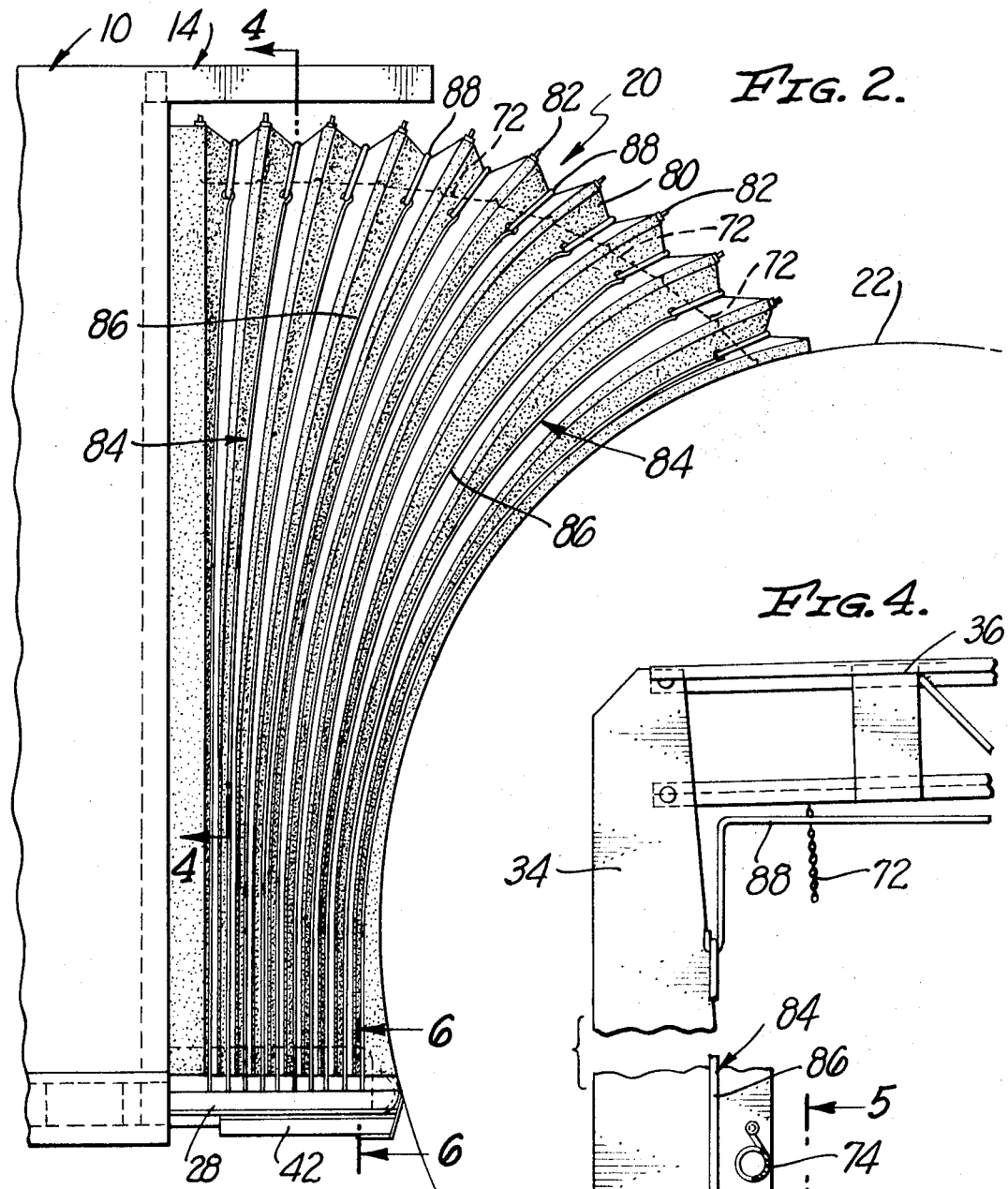

Patented Feb. 29, 1972 3,644,952
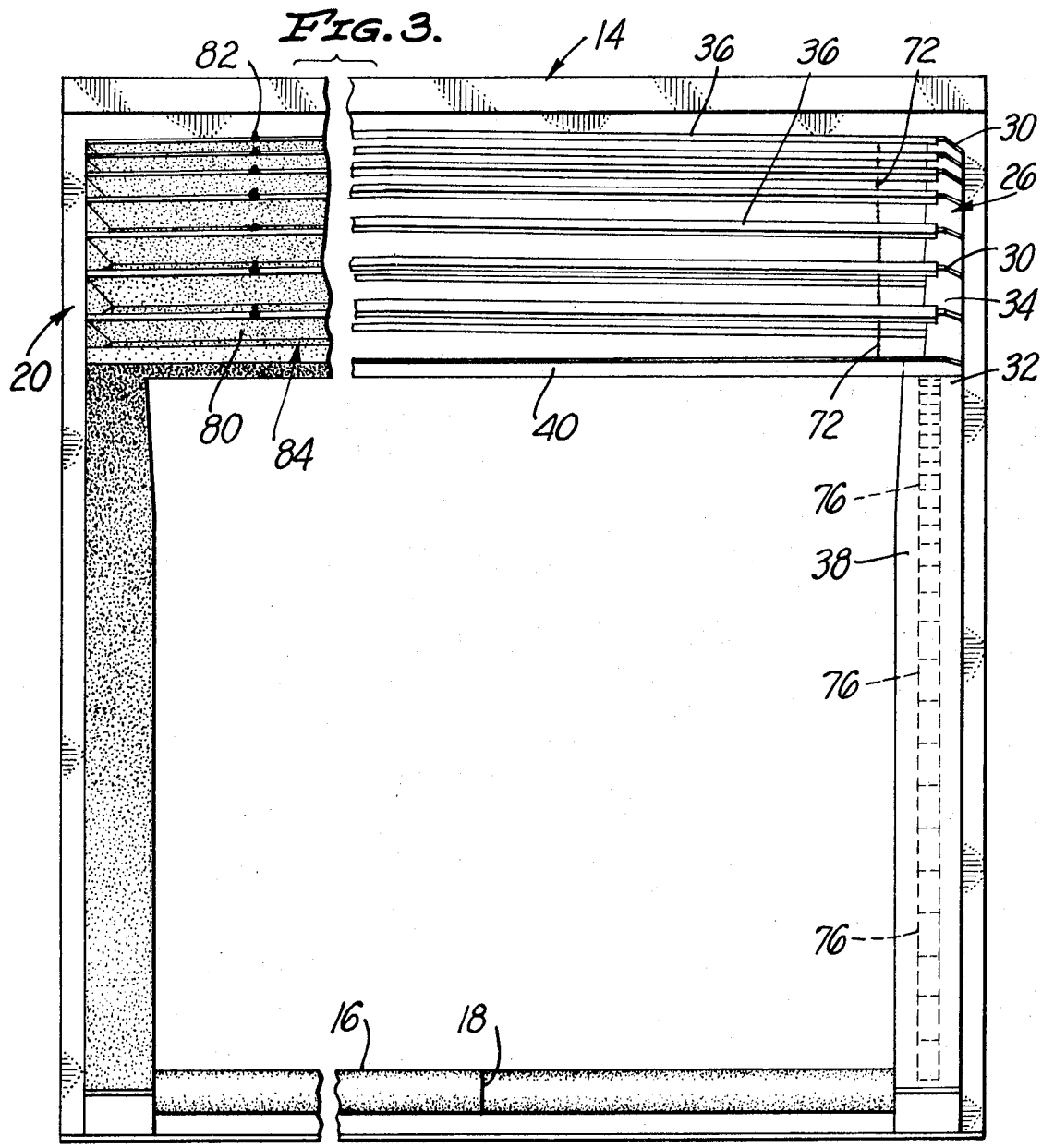
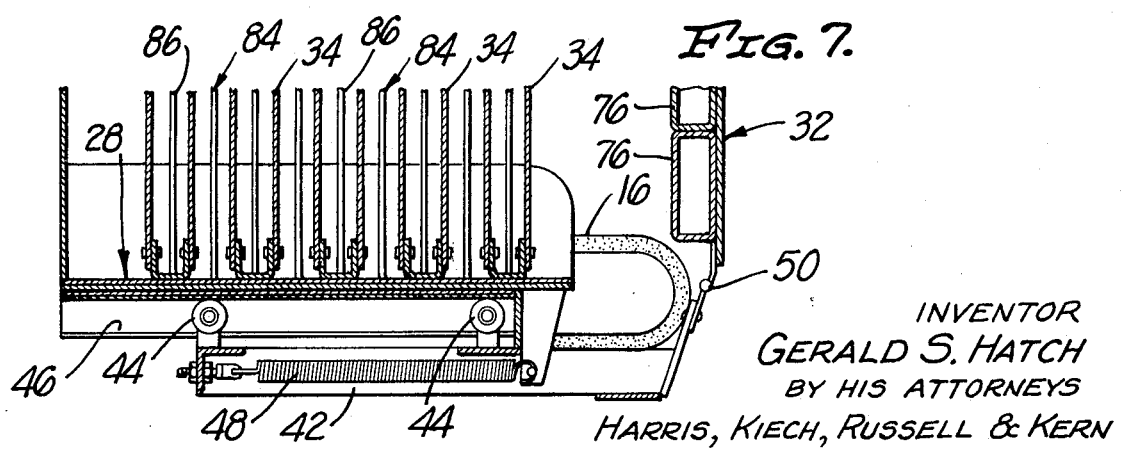
INVENTOR
GERALD S. HATCH
BY HIS ATTORNEYS
HARRIS, KIECH, RUSSELL & KERN 3,644,952

CANOPY FRAME ASSEMBLY FOR CAB OF AIRPLANE LOADING AND UNLOADING RAMP

BACKGROUND OF INVENTION

The invention relates in general to a passenger loading and unloading ramp for airplanes and, more particularly, to a cab having a flexible canopy structure for providing a substantially weatherproof seal between the cab and the fuselage of an airplane around a doorway therein, so that passengers may embark and debark during inclement weather without exposure to the elements.

As background, the invention contemplates a cab having a passageway therethrough one end of which communicates with a passageway through a loading and unloading ramp and the other end of which is registrable with a doorway in the fuselage of an airplane. The inner end of the passageway through the ramp communicates with an airport terminal building, or the like, so that embarking and debarking passengers may walk through the ramp and the cab from the terminal building to the airplane, and vice versa. The loading and unloading ramp may be of any of various types. For example, it may be a swing-type ramp, an extensible ramp, or a ramp which is both extensible and swingable. It also may be a mobile passenger conveyance.

It is conventional to provide loading and unloading ramps of the foregoing nature with a canopy structure which is engageable with the fuselage of the airplane around the doorway therein to provide a weathertight seal.

Since airplane fuselages are externally convex in the vicinities of the doorways therein, and since they frequently have materially different configurations in the vicinities of such doorways, the canopy structures with which the outer or forward ends of the cabs of passenger loading and unloading ramps are equipped characteristically contain various flexible and movable parts to accommodate variations in fuselage configurations from airplane to airplane, or from doorway to doorway in the same airplane. However, prior canopy structures have not been entirely successful in this respect, particularly where large differences in the longitudinal curvatures of the fuselages are encountered from one airplane to another, or from one doorway to another in the same airplane, or from one side to the other side of the same doorway.

SUMMARY AND OBJECTS OF INVENTION

A general object of the invention is to provide a canopy structure for a cab of an airplane loading and unloading ramp which is capable of accommodating a wide range of external fuselage configurations.

More particularly, an important object is to provide a canopy structure which is sufficiently flexible that it is capable of accommodating wide ranges of transverse and longitudinal fuselage curvatures.

The flexible canopy structure of the invention may be summarized as comprising, and an important object of the invention is to provide a canopy structure which comprises, a canopy frame assembly which includes: a series of canopy frames spaced apart longitudinally of and enclosing the passageway through the cab; the frames having the general configuration of an inverted U and each including laterally spaced, generally upright arms located on opposite sides of the passageway and connected at their lower ends to the cab structure; each frame including a transverse member above the passageway and interconnecting the upper ends of the arms of the frame; and the frames being rigid transversely of the passageway, but having arms which are differentially flexible in the longitudinal direction to permit the frame assembly to accommodate various fuselage curvatures, both transversely and longitudinally.

Another object is to render the arms of the canopy frames differentially flexible in the longitudinal direction by making them of a flexible material and by providing them with a width laterally of the passageway many times their thickness longitudinally thereof. Preferably, the canopy frame arms are made of a resilient material, such as spring steel. With this construction, the canopy frame assembly readily conforms to various transverse and longitudinal fuselage curvatures.

Other objects of the invention are to provide a canopy frame assembly of the foregoing nature having means for limiting the maximum and minimum longitudinal spacings and deflections thereof, and having means for retracting the frames rearwardly in the direction of the cab passageway when the canopy structure is not in use and extending them forwardly to close against the aircraft fuselage contours when in use.

Another object is to pivotally mount the end canopy frame in the series on supports which are movable longitudinally of the cab passageway and which are biased outwardly or forwardly. With this construction, the end canopy frame may flex more than the other canopy frames in the series to better accommodate various transverse fuselage curvatures and assure positive yet soft aircraft contact. In this connection, an important object is to provide means for limiting longitudinally rearward flexure of the arms of the end canopy frame.

Yet another object is to provide a canopy frame assembly including canopy tiedown members spaced apart longitudinally of and enclosing the passageway and alternating with the canopy frames, the tiedown members also being flexible longitudinally of the passageway and also having the general configuration of an inverted U.

Another object is to provide a canopy enclosing the canopy frames and enclosed by the tiedown members, the tiedown members being vertically and horizontally shorter than the canopy frames so as to pleat the canopy.

The foregoing objects, advantages, features and results of the present invention, together with various other objects, advantages, features and results thereof which will be evident to those skilled in the art in the light of this disclosure, may be attained with the exemplary embodiment of the invention illustrated in the accompanying drawings and described in detail hereinafter.

DESCRIPTION OF DRAWINGS

In the drawings:

FIG. 2 is a side elevational view of a canopy structure of the invention which embodies the canopy frame assembly shown in FIG. 1, the canopy frame assembly being shown retracted rearwardly in FIG. 1, and the canopy structure being shown extended forwardly into engagement with an airplane fuselage in FIG. 2;

FIG. 3 is a front elevational view of the canopy structure in its extended position, part of the canopy being removed to expose the canopy frame assembly;

FIG. 4 is an enlarged fragmentary sectional view taken as indicated by the arrowed line 4—4 of FIG. 2;

FIG. 5 is a further enlarged, fragmentary elevational view taken as indicated by the arrowed line 5—5 of FIG. 4;

FIG. 6 is an enlarged fragmentary sectional view taken as indicated by the arrowed line 6—6 of FIG. 2; and FIG. 7 is a fragmentary sectional view taken as indicated by the arrowed line 7—7 of FIG. 6 of the drawings.

DETAILED DESCRIPTION OF EXEMPLARY EMBODIMENT OF INVENTION

Figure 1:
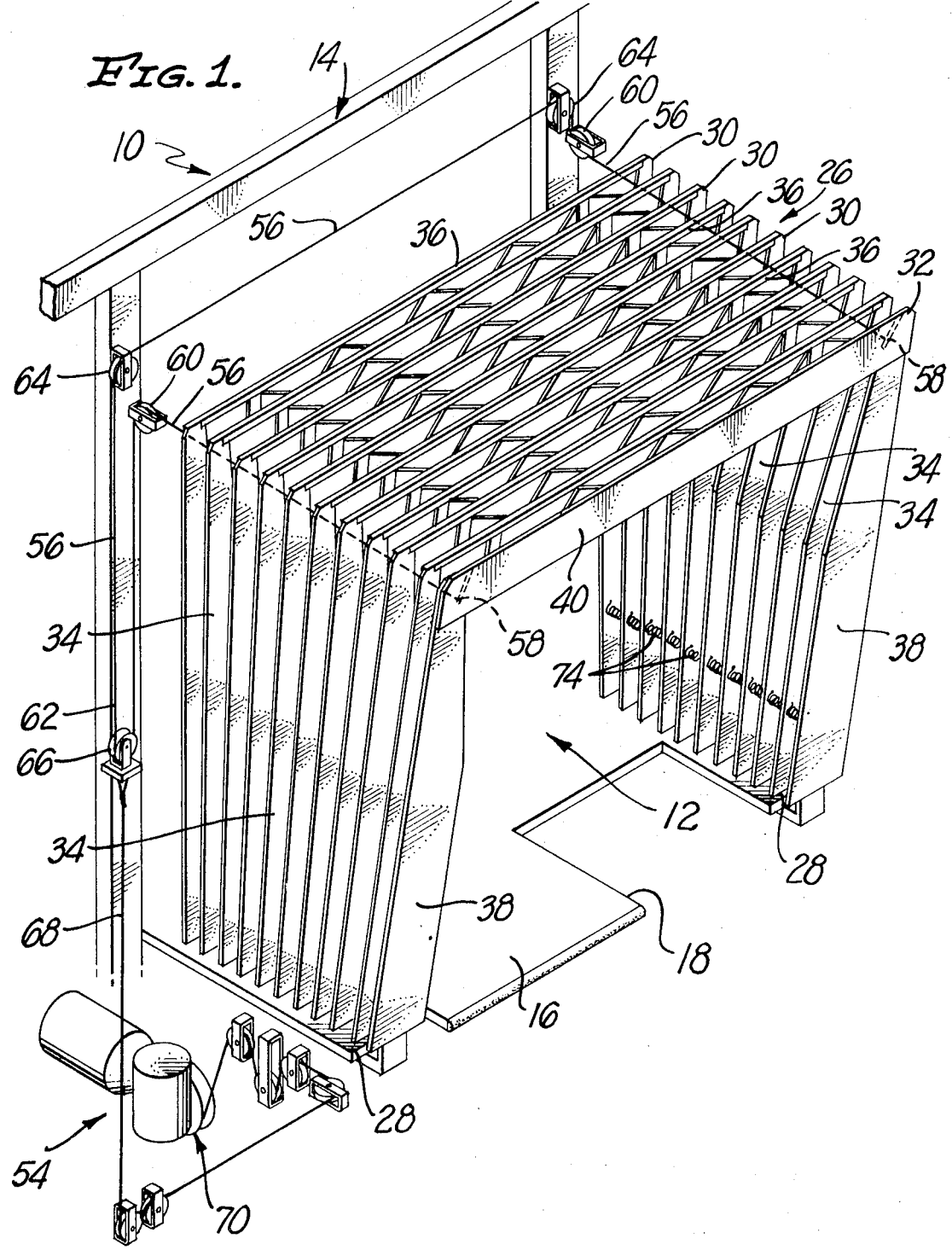
FIG. 1 is a semidiagrammatic perspective view illustrating the canopy frame assembly of the invention.

Referring initially to FIGS. 1 to 3 of the drawings, illustrated fragmentarily therein is a cab 10 mounted on the outer end of an airplane loading and unloading ramp, not shown, which communicates at its inner end with an airport terminal building, or the like. Such a ramp is well known in the art and is thus not illustrated in the drawings or described herein.

The cab 10 is provided with a passageway 12 extending longitudinally therethrough and includes a suitable framework 14 carrying a floor 16. The latter is provided in its forward edge with a notch 18 sometimes used to receive an outwardly opening airplane door, not shown, when the cab 10 is in use. As will be understood, passengers entering and leaving the airplane through the doorway in the fuselage thereof walk through the passageway 12 adjacent the notch 18.

As best shown in FIG. 2, the cab 10 is provided with a canopy structure 20 of the invention for forming a substantially weathertight seal around the doorway in the airplane fuselage, the latter being shown fragmentarily in FIG. 2 and designated by the numeral 22. An important feature of the invention is that the canopy structure 20 is capable of conforming both to the transverse curvature of the fuselage, as shown in FIG. 2, and to any longitudinal curvature thereof, not shown.

The canopy structure 20 includes a canopy frame assembly 26 which encloses the sides and top of the passageway 12, being carried by a supporting structure or structures 28 located at floor level and forming part of the cab framework 14. More particularly, the canopy frame assembly 26 includes a series of canopy frames 30 spaced apart longitudinally of the passageway 12, the series of canopy frames terminating at its forward end in a forward canopy frame 32 differing from the canopy frames 30 in a manner to be described hereinafter. Each of the canopy frames 30 and 32 has the general configuration of an inverted U.

Each canopy frame 30 includes laterally spaced, generally upright arms 34 located on opposite sides of the passageway 12 and rigidly interconnected at their upper ends by rigid transverse frame members 36, which are preferably trusses. The lower ends of the arms 34 of the canopy frames 30 are rigidly connected to the supporting structures 28, as by riveting, as shown in FIG. 7, or otherwise. Thus, the canopy frames 30 are cantilevered, relative to the supporting structure 28, longitudinally of the passageway 12.

The canopy frames 30 are rigid transversely of the passageway 12, but the arms 34 thereof are flexible longitudinally of the passageway. In other words, the canopy frames 30 are laterally stable, but are structurally in the unstable long column range in the longitudinal direction. This is accomplished by providing the canopy frame arms 34, which are preferably of spring steel, or other suitable material, with a width laterally of the passageway 12 many times their thickness longitudinally thereof. It is of major significance that by appropriate selection of the material and its thickness, width and contour for the arms 34, and by application of appropriate limiting controls, it is possible for the arms 34 to freely flex thru considerable and variable curvature and still support the weight of the canopy assembly, support and resist the various loadings of the elements, and still work at stresses below the material's yield point, precluding permanent set.

The forward canopy frame 32 is generally similar to the canopy frames 30 in that it is provided with laterally stable and longitudinally flexible arms 38. However, the canopy frame arms 38 are interconnected at their upper ends by a transverse frame member 40 which is similarly flexible in the longitudinal direction. Thus, the forward canopy frame 32 is laterally stable, but all three major components thereof are longitudinally flexible. The forward canopy frame 32 differs from the canopy frames 30 in another respect in that the lower ends of the arms 38 are connected to longitudinally movable supporting members 42 forming parts of the supporting structures 28. As best shown in FIGS. 6 and 7, each movable supporting member 42 is provided with wheels 44 longitudinally movable along tracks 46 on the stationary supporting structures 28. Tension springs 48 interconnecting the movable supporting members 42 and the stationary supporting structures 28 bias the movable supporting members 42, and the lower ends of the arms of the forward canopy frame 32, forwardly of the passageway 12. The lower ends of the arms 38 are pivotally connected to the movable supporting members 42 by transverse horizontal pivots 50, one of which is visible in FIG. 7.

The hereinbefore-discussed longitudinal flexibility of the canopy frames 30 and 32 permits the entire canopy frame assembly 26 to conform closely to the transverse curvature of the fuselage 22, as illustrated in FIG. 2, and also to any longitudinal curvature thereof. As will be apparent, conformance to any longitudinal curvature of the fuselage 22 results from differential flexing of the arms 34 of the canopy frames 30 and of the arms 38 of the forward canopy frame 32, the longitudinal flexibility of the transverse frame member 40 of the canopy frame 32 enhancing this effect.

Pivotally mounting the lower ends of the arms 38 of the forward canopy frame 32 on the differentially retractable supporting members 42 further enhances the capability of the forward canopy frame to accommodate both transverse and longitudinal fuselage curvatures. As shown in FIG. 2, the lower portions of the arms 38 of the forward canopy frame 32 can flex rearwardly, to accommodate transverse fuselage curvature, because of the pivotal connections to the supporting members 42.

An important feature of the invention is that the canopy frame assembly 26 automatically conforms in configuration to the fuselage 22 around the doorway therein in response to the actions of gravity plus inherent and supplemental spring loading. In other words, it is merely necessary to permit the canopy frame assembly 26 to move downwardly and forwardly under the combined influence of its own weight and spring action, whereupon the necessary flexing of the various canopy frames occurs. It will be understood, of course, that the forward canopy frame 32, and any other parts of the cab 10 which contact the fuselage 22, are suitably padded both to seal against the weather and to protect the fuselage.

The invention provides means designated generally by the numeral 54 in FIG. 1 of the drawings for extending and retracting the canopy structure 20 into and out of engagement with the fuselage 22. The extending and retracting means 54 is shown as comprising simply a cable 56 having its ends 58 suitably connected to the upper corners of the forward canopy frame 32. The end portions of the cable 56 are threaded through the trusses 36 of the canopy frames 30 and around pulleys 60 on the cab framework 14. The intermediate portion of the cable 56 is formed into a depending loop 62 on one side of the passageway 12, such loop being connected to the opposite end portion of the cable 56 by a portion of the cable which is trained around suitable pulleys 64. The intermediate loop 62 in the cable 56 is trained around a pulley 66 having connected thereto a cable 68 leading to a motor-driven winch 70 through a suitable succession of pulleys which are not specifically identified.

As will be apparent, if the winch 70 is driven in a direction to displace the movable pulley 66 downwardly, the cable 56 retracts the canopy frames 30 and 32. Conversely, if the winch 70 is driven in the opposite direction, the canopy structure 20 moves forwardly and downwardly under the influence of its own weight and spring action into engagement with the fuselage 22, automatically conforming to the transverse curvature of the fuselage and any longitudinal curvature thereof as it does so.

The canopy frame assembly 26 is provided with various means for controlling the longitudinal flexing of the canopy frames 30 and 32. As shown in FIGS. 2, 3 and 4, chains 72 interconnect the canopy frames 30 and 32 adjacent their upper corners to serve as means for limiting the maximum longitudinal spacing of these frames. (In FIG. 2, the chains 72 are shown taut to indicate the maximum longitudinal spacing of the canopy frames 30 and 32. However, with a larger radius fuselage 22, the chains 72 would be slack with the canopy structure 20 extended into engagement with such fuselage.)

Continuing to consider the flexure control means for the canopy frames 30 and 32, the arms 34 of the canopy frames 30 on both sides of the passageway 12 are separated by coil springs 74, FIGS. 4 and 5, suitably secured to such arms. When the canopy structure 20 is either extended or retracted the springs 74 act in compression to tend to equalize and limit the longitudinal spacing of the canopy frames 30.

The arms 38 of the forward canopy frame 32 have secured to their rear sides an upright series of blocks 76, FIGS. 3 and 7, which abut, as shown in FIG. 7, to prevent reverse flexure of the canopy frame arms 38. However, these blocks disengage each other to permit forward flexing of the canopy frame arms 38. Maximum curvature of the forward flexing of frame arms 38 is limited by a strap attached to the aft faces of the upright series of blocks 76.

The canopy structure 20 of the invention includes a canopy 80 of any suitable material (fabric, blanket or sandwich assembly) overlying the top of and enclosing the sides of the canopy frames 30 and 32 and suitably secured to the trusses 36 of the canopy frames 30, as by bolts 82. The canopy 80 is further held in place by, and is pleated by, canopy tiedown members 84 which are spaced apart longitudinally of and enclose the passageway 12 and which also have the general configuration of an inverted U. More particularly, the tiedown members 84 comprise upright rods 86 on opposite sides of the passageway 12 having their lower ends connected to the corresponding stationary supporting structures 28. The upper ends of the rods 86 are connected, by hook-and-eye connections, to transverse rods 88 extending across the top of the passageway 12. The tiedown members 84 are vertically shorter and transversely narrower than the canopy frames 30 and 32 so as to pleat the canopy 80.

As will be apparent, the tiedown members 84 flex longitudinally with the canopy frames 30 and 32 in extending and retracting the canopy structure 20, the pleats in the canopy correspondingly extending and contracting as the canopy structure is extended and retracted.

Thus, the present invention provides a canopy structure 20 which is capable of adapting itself to a wide variety of transverse and longitudinal fuselage curvatures, while protecting passengers negotiating the passageway 12, and the doorway in the fuselage, from the elements.

Although an exemplary embodiment of the invention has been disclosed for purposes of illustration, it will be understood that various changes, modifications and substitutions may be incorporated in such embodiments without departing from the spirit of the invention as defined by the claims appearing in the next section of this specification.

I claim as my invention:

1. In a canopy frame assembly for a cab which is provided with a passageway extending longitudinally therethrough and which is engageable with an airplane fuselage around a doorway therein with said passageway in register with the doorway, the combination of:
    a. a supporting structure;
    b. a series of canopy frames spaced apart longitudinally of and enclosing said passageway;
    c. each of said frames having the general configuration of an inverted U and including laterally spaced, generally upright arms located on opposite sides of said passageway and connected at their lower ends to said supporting structure;
    d. said frames including transverse members above said passageway and respectively interconnecting the upper ends of the arms thereof;
    e. said frames being rigid transversely of said passageway;
    f. said arms being flexible longitudinally of said passageway to enable said frames to move downwardly and forwardly relative to said passageway as the result of longitudinal flexing of said arms;
    g. the lower ends of the arms of certain of said frames being rigidly connected to said supporting structure so that such frames are cantilevered longitudinally of said passageway; and
    h. means for displacing said frames upwardly and rearwardly.

2. A canopy frame assembly as defined in claim 1 wherein said arms of said frames have a width laterally of said passageway many times their thickness longitudinally thereof.

3. A canopy frame assembly as set forth in claim 1 wherein said series terminates at its longitudinally forward end in a frame the lower ends of the arms of which are pivotally connected to said supporting structure.

4. A canopy frame assembly as defined in claim 3 wherein said arms of said end frame in said series are provided with means for limiting longitudinally rearward flexure thereof.

5. A canopy frame assembly according to claim 4 wherein said end frame in said series is mounted on portions of said supporting structure which are movable longitudinally of said passageway, and wherein means are provided for biasing such portions forwardly.

6. A canopy frame assembly as defined in claim 1 including means interconnecting said frames for limiting the maximum longitudinal spacing thereof.

7. A canopy frame assembly according to claim 1 including means interconnecting said frames for limiting the minimum longitudinal spacing thereof.

8. A canopy frame assembly as defined in claim 1 including canopy tiedown members spaced apart longitudinally of and enclosing said passageway and alternating with said canopy frames, said tiedown members also having the general configuration of an inverted U and being connected at their lower ends to said supporting structure, and said tiedown members also being flexible longitudinally of said passageway.

9. In combination:
    a. a canopy frame assembly according to claim 8;
    b. a canopy overlying said canopy frames and underlying said tiedown members; and
    c. said tiedown members being vertically shorter than said canopy frames so as to pleat said canopy.

* * * * *